US012134917B2

(12) United States Patent
Lyu

(10) Patent No.: US 12,134,917 B2
(45) Date of Patent: Nov. 5, 2024

(54) SECURING DEVICE

(71) Applicant: Tse-Haw Ling, New Taipei (TW)

(72) Inventor: Hao-Jhong Lyu, New Taipei (TW)

(73) Assignee: SINOX CO., LTD., New Taipei (TW)

( * ) Notice: Subject to any disclaimer, the term of this patent is extended or adjusted under 35 U.S.C. 154(b) by 248 days.

(21) Appl. No.: 17/517,177

(22) Filed: Nov. 2, 2021

(65) Prior Publication Data

US 2022/0412128 A1 Dec. 29, 2022

(30) Foreign Application Priority Data

Jun. 25, 2021 (TW) ................................ 110207436

(51) Int. Cl.
*E05B 67/00* (2006.01)

(52) U.S. Cl.
CPC ................................ *E05B 67/003* (2013.01)

(58) Field of Classification Search
CPC .... E05B 67/003; E05B 37/0058; E05B 37/02; E05B 73/0005; E05B 71/00; E05B 13/103; E05B 73/0017; E05B 37/025; E04H 1/02
See application file for complete search history.

(56) References Cited

U.S. PATENT DOCUMENTS 1,940,789 A * 12/1933 Diaz .................... E05B 37/025 70/333 R
3,419,893 A * 12/1968 Vahlstrom ............ E05B 37/025 70/24
4,679,419 A * 7/1987 Scelba .................... E05B 37/02 70/312
5,367,785 A 11/1994 Benarroch
(Continued)

FOREIGN PATENT DOCUMENTS

CN 206957375 U 2/2018
CN 211691926 U * 10/2020
(Continued)

OTHER PUBLICATIONS

Goto K , Merged Patent and Image, CN-1469025-A, Jan. 2004, CN, (Year: 2004).*
(Continued)

*Primary Examiner* — Christine M Mills
*Assistant Examiner* — Faria F Ahmad
(74) *Attorney, Agent, or Firm* — Birch, Stewart, Kolasch & Birch, LLP

(57) ABSTRACT

A securing device which includes a body and a cable is provided. The body includes a housing and a fixing unit. The housing includes a restricting hole, a first end portion and a second end portion disposed on opposite ends, and a first operating face, a display face, and a second operating face disposed between the first end portion and the second end portion. The restricting hole penetrates the housing from the display face having a display area. The fixing unit is disposed in the housing and includes a rotating disc. The outer rim of the rotating disc extends out of at least one of the first operating face and the second operating face. The display area displays a symbol on the rotating disc. The free end of the cable passes through the display face via the restricting hole. The fixing unit is capable of restricting the cable from moving.

16 Claims, 5 Drawing Sheets

(56) References Cited

U.S. PATENT DOCUMENTS 5,520,032 A * 5/1996 Ling ..................... E05B 37/025 70/25
5,850,751 A * 12/1998 Kuo ..................... E05B 37/025 70/52
5,924,313 A * 7/1999 Kuo ..................... E05B 37/025 70/312
5,927,113 A * 7/1999 Yu ..................... E05B 37/14 70/68
6,305,197 B1 * 10/2001 Ling ..................... E05B 73/0005 70/30
D450,560 S * 11/2001 Yu ..................... E05B 67/003 D8/333
D460,341 S * 7/2002 Ling ..................... E05B 37/025 D8/330
6,619,081 B1 * 9/2003 Yu ..................... E05B 73/0005 70/58
6,672,117 B2 * 1/2004 Yu ..................... E05B 73/0082 70/333 R
6,681,603 B1 1/2004 Yu
7,185,518 B1 * 3/2007 Huang ..................... E05B 73/0082 70/58
7,712,339 B2 * 5/2010 Hentschel ..................... E05B 67/003 70/30
7,866,505 B2 * 1/2011 Perlman ..................... A45C 13/18 220/756
D659,506 S * 5/2012 Kemppainen ..................... D8/334
D695,976 S * 12/2013 Allen, Jr. ..................... D30/153
9,834,958 B2 * 12/2017 Tirkkonen ..................... E05B 19/0005
10,825,361 B1 * 11/2020 Schmidt ..................... G09F 3/02
2002/0073751 A1 * 6/2002 Wilson ..................... B62K 21/12 70/233
2002/0104337 A1 * 8/2002 Kuo ..................... E05B 37/025 70/30
2003/0200775 A1 * 10/2003 Yu ..................... E05B 37/025 70/58
2004/0089032 A1 * 5/2004 Ling ..................... E05B 37/025 70/30
2005/0223756 A1 * 10/2005 Ling ..................... E05B 73/0011 70/30
2006/0027002 A1 * 2/2006 Cheng ..................... E05B 73/0005 70/58
2006/0137413 A1 * 6/2006 Yu ..................... E05B 35/105 70/63
2006/0254329 A1 * 11/2006 Yu ..................... E05B 37/02 70/284
2007/0125138 A1 * 6/2007 Miao ..................... E05B 73/0082 70/58
2007/0157681 A1 * 7/2007 Miao ..................... E05B 27/083 70/58
2008/0028805 A1 * 2/2008 Yu ..................... E05B 37/0034 70/69
2008/0066503 A1 * 3/2008 Su ..................... E05B 37/02 70/58
2008/0087057 A1 * 4/2008 Yu ..................... E05B 73/0082 70/232
2008/0190931 A1 * 8/2008 Perlman ..................... A45C 13/20 220/315
2008/0295548 A1 * 12/2008 Misner ..................... E05B 37/025 70/432
2009/0145178 A1 * 6/2009 Nave ..................... E05B 37/02 70/21
2011/0083483 A1 * 4/2011 Yang ..................... E05B 37/0034 70/284
2012/0186313 A1 * 7/2012 Yang ..................... E05C 3/042 70/284
2012/0312056 A1 * 12/2012 Yu ..................... E05B 73/0082 70/14
2013/0121621 A1 * 5/2013 Misner ..................... E05B 37/02 383/42
2013/0174616 A1 * 7/2013 Allen, Jr. ..................... A01K 27/001 119/793
2014/0013552 A1 * 1/2014 Liang ..................... E06B 7/00 24/68 CD
2014/0290315 A1 * 10/2014 Yang ..................... E05B 73/0082 70/58
2015/0000613 A1 * 1/2015 Cooke ..................... E05B 67/06 70/20
2015/0368929 A1 * 12/2015 Yang ..................... E05B 37/0003 70/333 R
2017/0096841 A1 * 4/2017 Hall ..................... B60R 25/02136
2019/0153750 A1 * 5/2019 Lai ..................... E05B 37/025
2019/0186174 A1 * 6/2019 Lam ..................... E05B 37/025
2019/0218823 A1 * 7/2019 Tsai ..................... E05B 37/025
2020/0149322 A1 * 5/2020 Heath ..................... E05B 73/0005
2020/0190855 A1 * 6/2020 Lai ..................... E05B 37/002
2020/0217103 A1 * 7/2020 Lai ..................... E05B 37/025
2020/0323314 A1 * 10/2020 Wan ..................... E05B 35/105
2021/0131146 A1 * 5/2021 Kuchler ..................... E05B 37/025
2021/0388644 A1 * 12/2021 Wong ..................... E05B 37/0058
2023/0079422 A1 * 3/2023 Su ..................... E05B 73/0005 70/21
2023/0175288 A1 * 6/2023 Sieme ..................... E05B 37/0058 70/25

FOREIGN PATENT DOCUMENTS

DE 202013011957 U1 * 12/2014 ........... E05B 37/025
DE 202015002045 U1 * 6/2015 ........... E05B 17/106
DE 202018103265 U1 * 8/2018 ........... A45C 13/20
JP 11-22272 A 1/1999
KR 20-2013-0004342 U 7/2013
TW 200718850 A 5/2007
WO WO-9713946 A1 * 4/1997 ......... B65D 63/1072

OTHER PUBLICATIONS

United Kingdom Search Report for United Kingdom Application No. GB2115564.3, dated Apr. 29, 2022.

* cited by examiner

SECURING DEVICE

BACKGROUND

Field of the Invention

The present invention generally relates to a securing device. More particularly, the present invention relates to a securing device which is capable of locking an object.

Related Art

Regarding locks, a U.S. Pat. No. 7,712,339 disclosed a joint rod lock, which includes a lock body and a joint bar hoop formed via linking a plurality of bars. Such a lock can be folded up to reduce the volume thereof according to the user's needs.

Compared with the conventional U-shape padlocks having a bulky volume, the abovementioned linkage locks indeed have the advantage of size reduction when it is collapsed for storage. However, the abovementioned prior arts still have room for improvement in terms of the convenience for use since it can't be adjusted in accordance with the size of the object to be locked.

SUMMARY OF THE INVENTION

The object of the present invention is to provide a securing device which is more convenient to use to resolve the issues of the prior arts.

The securing device includes a body and a cable. The body includes a housing and a fixing unit. The housing includes a restricting hole, a first end portion and a second end portion disposed on opposite ends of the housing, and a first operating face, a display face, and a second operating face disposed between the first end portion and the second end portion. The first operating face, the display face, and the second operating face are sequentially adjacent to each other. The display face has a display area. The restricting hole penetrates the housing from the display face. The fixing unit is disposed in the housing. The fixing unit includes a rotating disc, wherein the outer rim of the rotating disc extends out of at least one of the first operating face and the second operating face. The display area is capable of displaying a symbol on the rotating disc. The cable includes a free end and a connecting end. The free end is capable of passing through the display face via the restricting hole. The fixing unit is capable of restricting the cable from moving. The connecting end is connected to the second end portion.

In one embodiment, the housing includes a display face, a first operating face, a second operating face, and a restricting hole. The display face has a display area. The first operating face extends backward from one side of the display face. The second operating face extends backward from the other side of the display face. One side of the first operating face, one side of the display face, and one side of the second operating face are connected with each other and form a first end portion of the housing. The other side of the first operating face, the other side of the display face, and the other side of the second operating face are connected with each other and form a second end portion of the housing.

In one embodiment, the first operating face has a first hollow part, and the second operating face has a second hollow part, wherein the outer rim of the rotating disc extends simultaneously out of the first hollow part and the second hollow part.

In one embodiment, the body further includes an operating unit for operating the fixing unit to restrict the cable from moving or to release the cable, and the operating unit is disposed in the housing, wherein a portion of the operating unit extends out of the housing.

In one embodiment, the operating unit extends out of the housing from the operating face.

In one embodiment, the restricting hole is disposed between the first end portion and the display area.

In one embodiment, the cable bends on the other side of the body with respect to the display face to make the free end face the first end portion.

In one embodiment, the first operating face has a first concave portion, wherein the first hollow part is in the first concave portion. The second operating face has a second concave portion, wherein the second hollow part is in the second concave portion.

In one embodiment, the display face faces a first plane. The normal projection of the portion of the outer rim of the rotating disc extending out of the first hollow part on the first plane is within the scope of the normal projection of the housing on the first plane. The normal projection of the portion of the outer rim of the rotating disc extending out of the second hollow part on the first plane is within the scope of the normal projection of the housing on the first plane.

In one embodiment, the display area is hollowed.

DETAILED DESCRIPTION

A securing device provided in the present invention is used for securing different sizes of objects. The structure and the operation of the present invention will be illustrated in the following description.

Figure 1A:
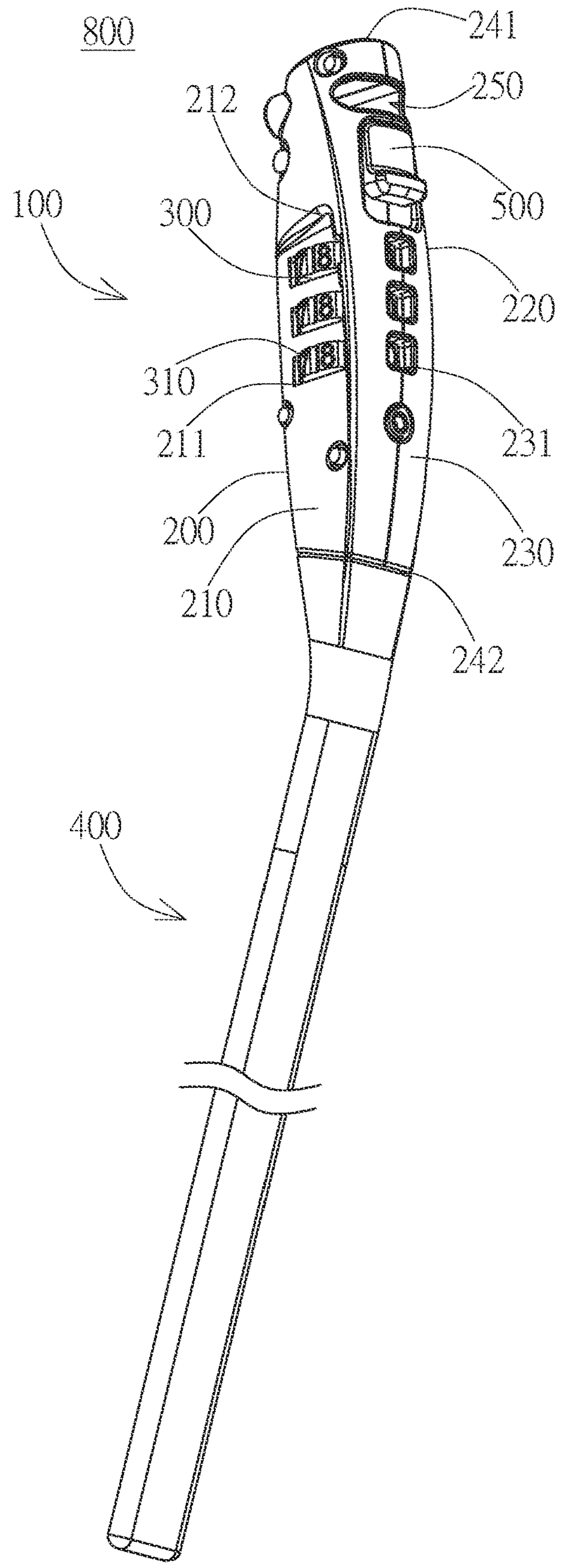
FIGS. 1A and 1B are perspective views of an embodiment of the securing device of the present invention.
Figure 1B:
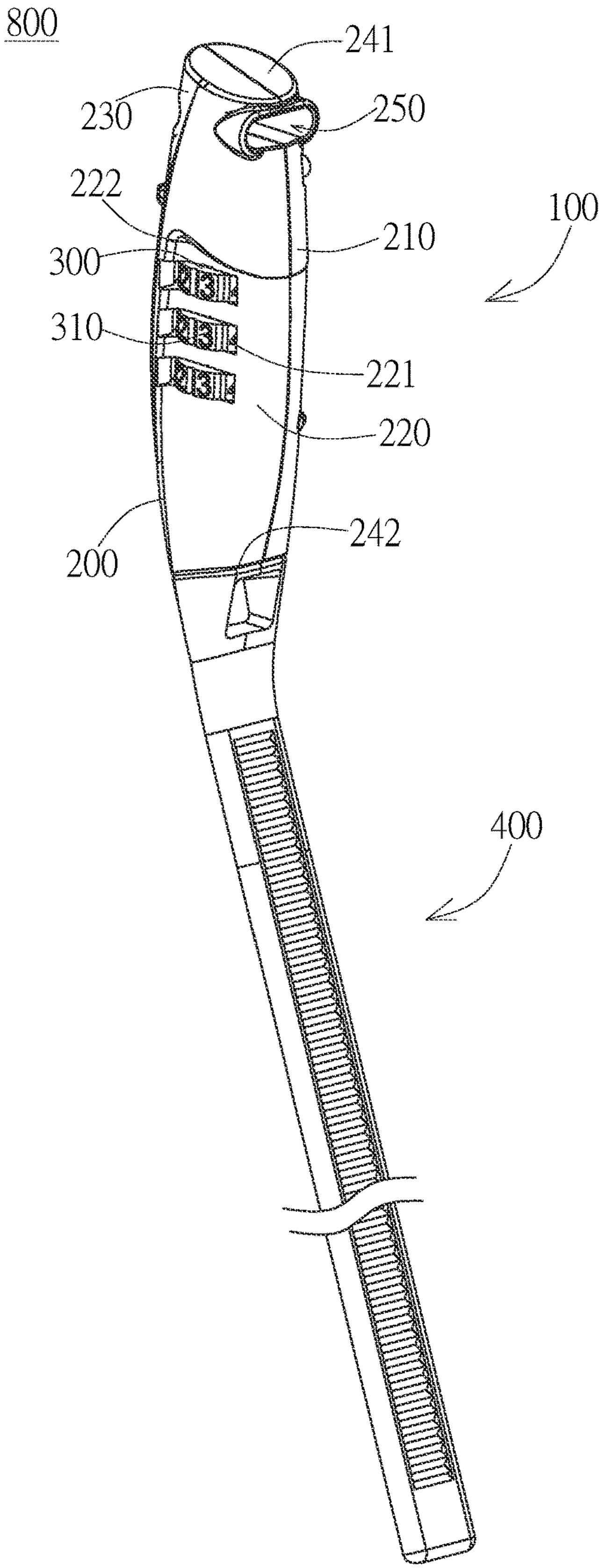

As shown in the embodiments in FIGS. 1A and 1B, the securing device 800 of the present invention includes a body 100 and a cable 400. The body 100 includes a housing 200 and a fixing unit 300. The housing 200 includes a restricting hole 250, a first end portion 241 and a second end portion 242 disposed on opposite ends of the housing 100, and a first operating face 210, a display face 230, and a second operating face 220 disposed between the first end portion 241 and the second end portion 242. The first operating face 210, the display face 230, and the second operating face 220 are sequentially adjacent to each other. From a different point of view, the housing 200 includes a display face 230, a first operating face 210, a second operating face 220, and a restricting hole 250. The first operating face 210 extends backward from one side of the display face 230. The second operating face 220 extends backward from the other side of the display face 230. One side of the first operating face 210, one side of the display face 230, and one side of the second operating face 220 are connected with each other and form a first end portion 241 of the housing 100. The other side of the first operating face 210, the other side of the display face 230, and the other side of the second operating face 220 are connected with each other and form a second end portion 242 of the housing 100. The housing 200 could be modified according to the manufacturing, design, and usage requirements. For example, the first operating face 210 and the second operating face 220 could be parallel to each other so that force may be applied more easily during operation, or the housing 200 could have less sharp angles to avoid scratching, etc.

As shown in the embodiments in FIGS. 1A and 1B, the first operating face 210 has a first hollow part 211. The second operating face 220 has a second hollow part 221. The display face 230 has a display area 231. The restricting hole 250 penetrates the housing 200 from the display face 230. The fixing unit 300 is disposed in the housing 200. The fixing unit 300 includes a rotating disc 310, wherein the outer rim of the rotating disc 310 extends simultaneously out of the first operating face 211 and the second operating face 221. The display area 231 is capable of displaying a symbol, e.g., a character or a number, on the rotating disc. More particularly, in an embodiment, the fixing unit 300 is a combination lock having a plurality of rotating discs 310, wherein the diameter of the rotating disc 310 is larger than the width of the housing 200.

Therefore, the opposite sides of the outer rims of the rotating discs 310 can extend simultaneously out of the first operating face 211 and the second operating face 221 for a user to apply force on the outer rims of the rotating discs 310 to rotate the rotating discs 310 more easily. In different embodiments, however, the outer rim of the rotating disc 310 can extend out of only one of the first operating face 211 and the second operating face 221 for the user to apply force on the outer rims of the rotating discs 310 to rotate the rotating discs 310. The display area 231 is hollowed for the user to view the symbol on the rotating discs 310 to identify the position of the rotating discs 310 while rotating them. A light-transmittable cover could be further disposed on the display area 231 to prevent dust or moisture from entering the housing 200 through the display area 231. In different embodiments, the housing 200 is light-transmittable. In this situation, any area of the display face 230 in which the user can view the symbol on the rotating discs 310 could be considered the display area 231.

Figure 2A:
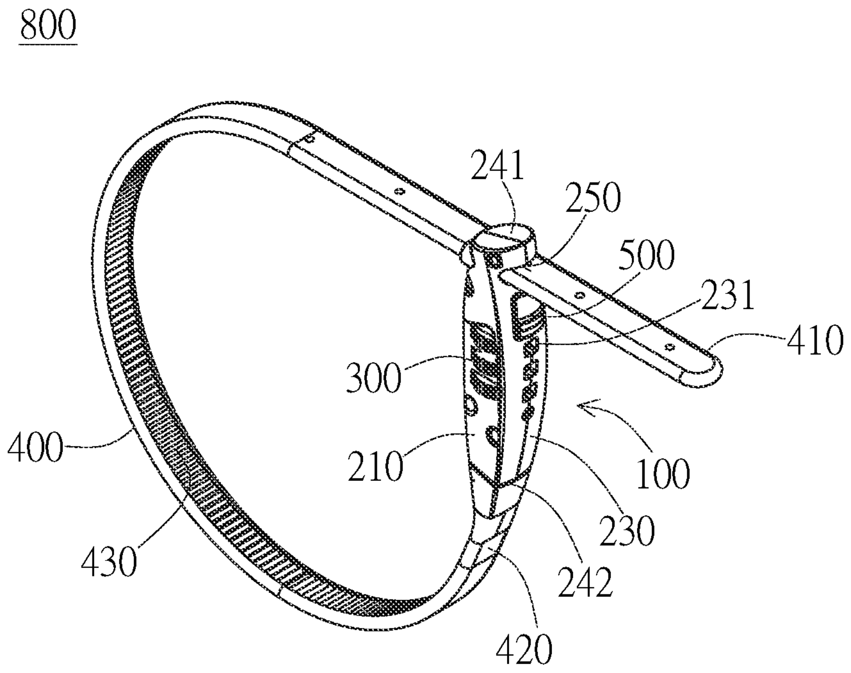
FIGS. 2A and 2B are perspective views of an embodiment of the securing device of the present invention showing the cable inserts into the restricting hole.
Figure 2B:
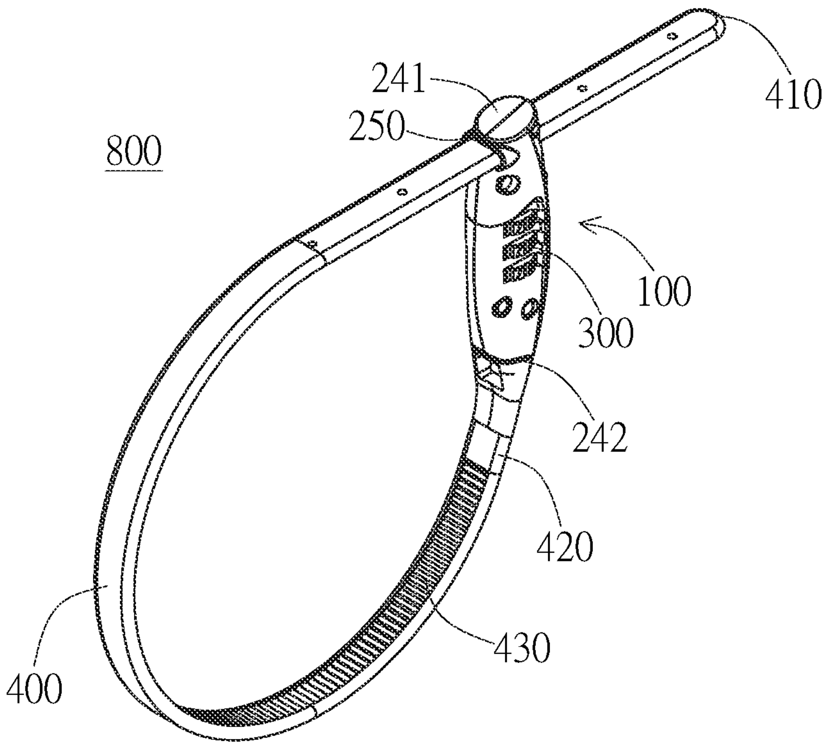
Figure 3:
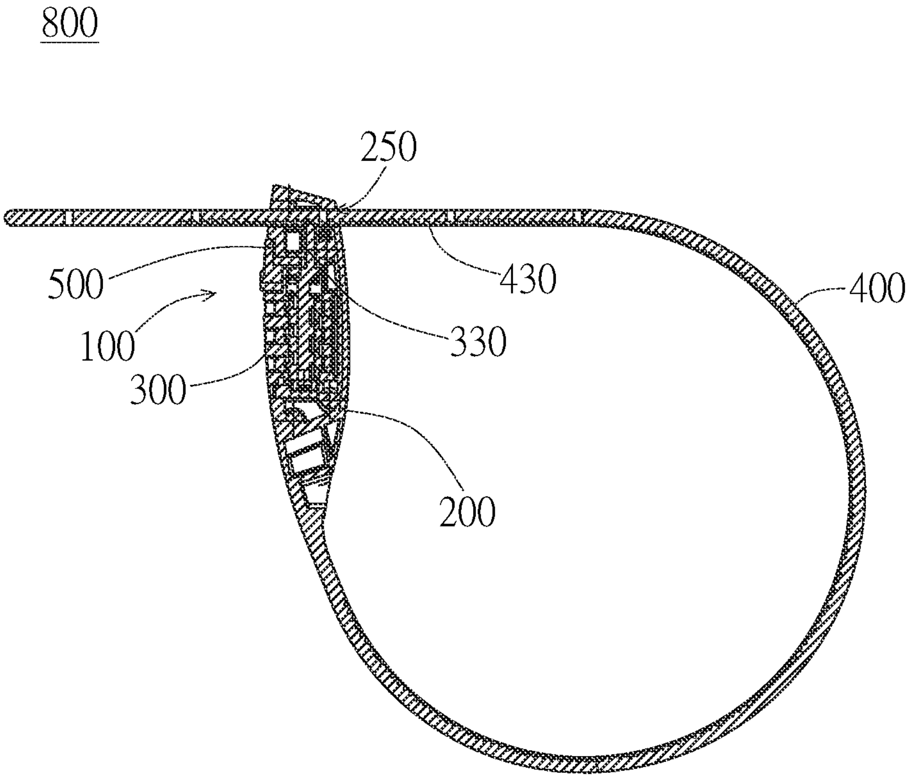
FIG. 3 is a perspective view of an embodiment of the securing device of the present invention showing the rod engages with the ratchet teeth.

As shown in the embodiments in FIGS. 2A and 2B, the cable 400 includes a free end 410 and a connecting end 420. The free end 410 is capable of passing through the display face 230 via the restricting hole 250. The fixing unit 300 is capable of restricting the cable 400 from moving. The connecting end 420 is connected to the second end portion 242. The restricting hole 250 is disposed between the first end portion 241 and the display area 231, i.e., in a position closer to the first end portion 241. A plurality of ratchet teeth 430 are disposed on one side of the cable 400 for engaging. More particularly, as shown in the embodiments in FIG. 3, the fixing unit 300 has a rod 330 capable of inserting into the restricting hole 250. A plurality of ratchet teeth 430 are disposed in line on one side of the cable 400. Furthermore, as shown in the embodiments in FIG. 3, the body 100 could include an operating unit 500 for operating the fixing unit 300 to restrict the cable 400 from moving or to release the cable 400. The operating unit 500 is disposed in the housing 200, wherein a portion of the operating unit 500 extends out of the housing 200. When the fixing unit is unlocked (e.g., the rotating discs 310 are in correct numbers), the rod 330 is movable. The user can move the operating unit 500 to make the rod 330 leave the ratchet teeth 430 to remove the engagement, i.e., to release the restriction of the movement of cable 400, and let the cable 400 be capable of leaving the restricting hole 250. In different embodiments, however, the cable 400 doesn't have the ratchet teeth 430 and is not limited to moving unidirectionally. Units such as the rod 330 of the fixing unit 300 can engage with the surface of the cable 400 to restrict it from moving.

To sum up, when the fixing unit 300 is in an unlocked state, the user can pull the cable 400 out of the restricting hole 250 and insert it into an object (such as a wheel frame of a bike) to be secured. After then, as shown in the embodiments in FIGS. 2A and 2B, the user can pass the free end 410 through the display face 230 via the restricting hole 250 and pull out the cable 400 to make the range surrounded by the cable 400 meet the requirements and achieve the goal of securing the object. Since the range surrounded by the cable 400 can be adjusted according to the size of the object to be secured, the securing device 800 of the present invention is more convenient to use. In one embodiment, the cable 400 bends preferably on the other side of the body 100 with respect to the display face 230 to make the free end 410 face the first end portion 241, so as to prevent the cable 400 from shading the display face 230.

As shown in the embodiments in FIGS. 1A and 1B, the first operating face 210 has a first concave portion 212, wherein the first hollow part 211 is in the first concave portion 212.

The second operating face 220 has a second concave portion 222, wherein the second hollow part 221 is in the second concave portion 222. As such, the width of the housing 200 is substantially reduced. Accordingly, even if rotating discs 310 having a smaller diameter are used, the opposite sides of the outer rims of the rotating discs 310 can still extend simultaneously out of the first operating face 211 and the second operating face 221 for a user to apply force on the outer rims of the rotating discs 310 to rotate the rotating discs 310 more easily.

Figure 4:
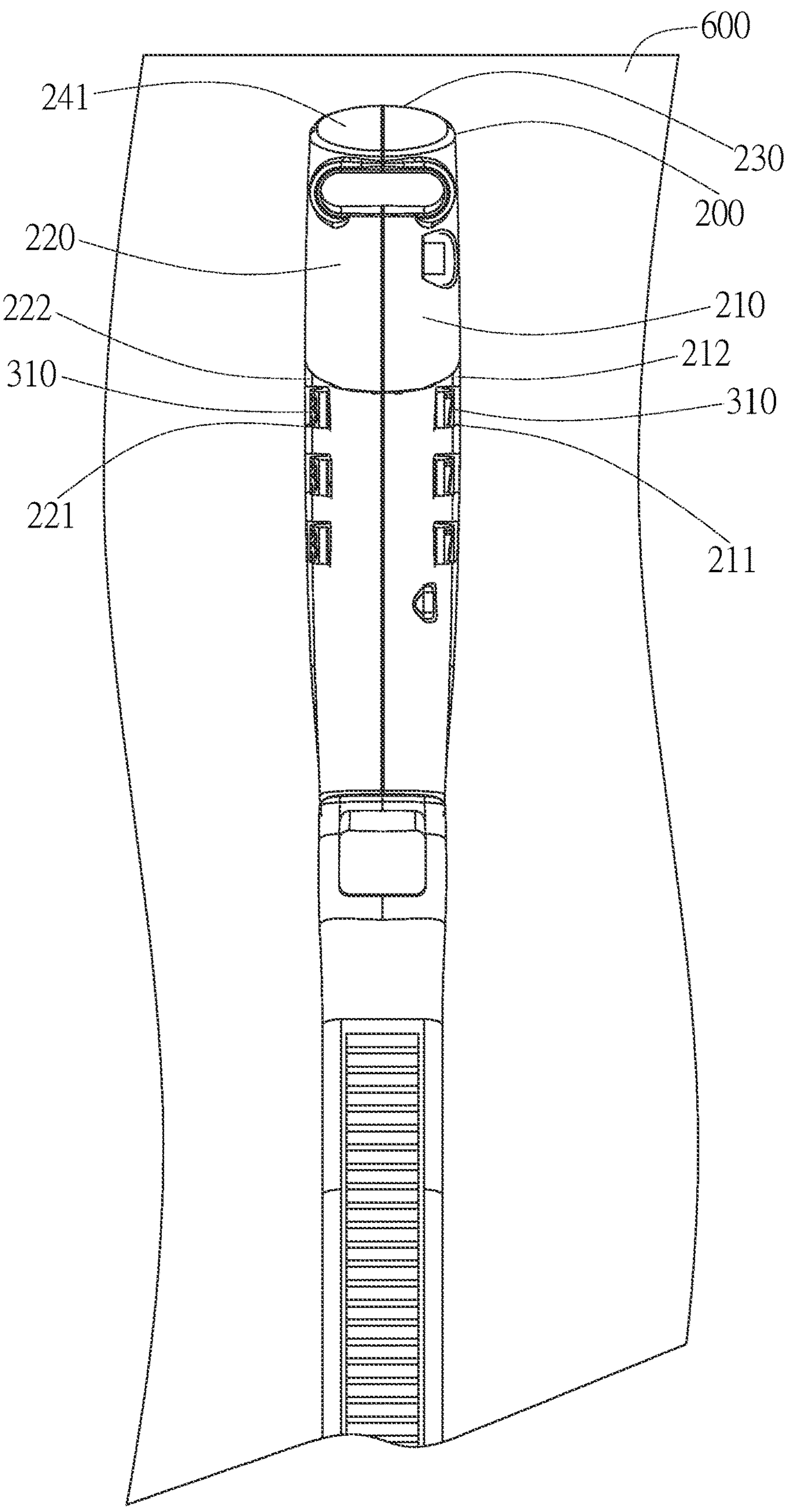
FIG. 4 is a perspective view of a different embodiment of the securing device of the present invention.

As shown in the embodiments in FIG. 4, the display face 230 faces a first plane 600. The normal projection of the portion of the outer rim of the rotating disc 310 extending out of the first hollow part 211 on the first plane is within the scope of the normal projection of the housing 200 on the first plane 600. The normal projection of the portion of the outer rim of the rotating disc 310 extending out of the second hollow part 221 on the first plane 600 is within the scope of the normal projection of the housing 200 on the first plane 600. In other words, the outer rim of the rotating disc 310 is totally accommodated in the first concave portion 212 and the second concave portion 222 to avoid mis-numbering or damage caused by the rotating disc 310 being collided.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A securing device, comprising:
a body, including:
a housing, including:
a first end portion and a second end portion disposed on opposite ends of the housing;
a first operating face, a display face, and a second operating face, are all disposed between the first end portion and the second end portion, wherein the first operating face, the display face, and the second operating face are sequentially adjacent to each other, wherein the display face has a display area; and a restricting hole penetrating the housing from the display face near the first end portion; and a fixing unit disposed in the housing, wherein the fixing unit includes a rotating disc, wherein an outer rim of the rotating disc extends out of at least one of the first operating face and the second operating face, wherein the display area is capable of displaying a symbol on the rotating disc; and a cable including a free end and a connecting end, wherein the free end is capable of passing through the display face via the restricting hole, wherein the fixing unit is capable of restricting the cable from moving, wherein the connecting end is directly fixed on an outer surface of the second end portion, wherein the body further includes an operating unit for operating the fixing unit to restrict the cable from moving or to release the cable, wherein the operating unit is disposed in the housing, wherein a portion of the operating unit extends out of the housing.

2. The securing device according to claim 1, wherein the first operating face has a first hollow part, wherein the second operating face has a second hollow part, wherein the outer rim of the rotating disc extends simultaneously out of the first hollow part and the second hollow part.

3. The securing device according to claim 2, wherein the first operating face has a first concave portion, wherein the first hollow part is in the first concave portion, wherein the second operating face has a second concave portion, wherein the second hollow part is in the second concave portion.

4. The securing device according to claim 3, wherein the outer rim of the rotating disc does not extend out of the first operating face from the first concave portion and does not extend out of the second operating face from the second concave portion.

5. The securing device according to claim 1, wherein the operating unit extends out of the housing from the display face.

6. The securing device according to claim 1, wherein the restricting hole is disposed between the first end portion and the display area.

7. The securing device according to claim 1, wherein the cable bends on a side of the body with respect to the display face to make the free end face the first end portion.

8. The securing device according to claim 1, the display area is hollowed.

9. A securing device, comprising:

a body, including:

a housing, including:

a display face having a display area;

a first operating face extending backward from one side of the display face;

a second operating face extending backward from an opposite side of the display face with respect to the first operating face, wherein one side of the first operating face, one side of the display face, and one side of the second operating face are connected with each other and form a first end portion of the housing, wherein the other side of the first operating face, the other side of the display face, and the other side of the second operating face are connected with each other and form a second end portion of the housing; and a restricting hole penetrating the housing from the display face near the first end portion; and a fixing unit disposed in the housing, wherein the fixing unit includes a rotating disc, wherein an outer rim of the rotating disc extends out of at least one of the first operating face and the second operating face, wherein the display area is capable of displaying a symbol on the rotating disc; and a cable including a free end and a connecting end, wherein the free end is capable of passing through the display face via the restricting hole, wherein the fixing unit is capable of restricting the cable from moving, wherein the connecting end is directly fixed on an outer surface of the second end portion, wherein the body further includes an operating unit for operating the fixing unit to restrict the cable from moving or to release the cable, wherein the operating unit is disposed in the housing, wherein a portion of the operating unit extends out of the housing.

10. The securing device according to claim 9, wherein the first operating face has a first hollow part, wherein the second operating face has a second hollow part, wherein the outer rim of the rotating disc extends simultaneously out of the first hollow part and the second hollow part.

11. The securing device according to claim 10, wherein the first operating face has a first concave portion, wherein the first hollow part is in the first concave portion, wherein the second operating face has a second concave portion, wherein the second hollow part is in the second concave portion.

12. The securing device according to claim 11, wherein the outer rim of the rotating disc does not extend out of the first operating face from the first concave portion and does not extend out of the second operating face from the second concave portion.

13. The securing device according to claim 9, wherein the operating unit extends out of the housing from the display face.

14. The securing device according to claim 9, wherein the restricting hole is disposed between the first end portion and the display area.

15. The securing device according to claim 9, wherein the cable bends on a side of the body with respect to the display face to make the free end face the first end portion.

16. The securing device according to claim 9, the display area is hollowed.

* * * * *